United States Patent
deGreef et al.

(10) Patent No.: US 8,397,763 B2
(45) Date of Patent: Mar. 19, 2013

(54) LOW PRESSURE VALVE ASSEMBLY

(75) Inventors: Jules A. deGreef, Sandy, UT (US); David B. Beck, Draper, UT (US); Corey B. Welch, North Salt Lake City, UT (US)

(73) Assignee: Bend Tech, LLC, Draper, UT (US)

( * ) Notice: Subject to any disclaimer, the term of this patent is extended or adjusted under 35 U.S.C. 154(b) by 537 days.

(21) Appl. No.: 12/604,922

(22) Filed: Oct. 23, 2009

(65) Prior Publication Data

US 2011/0095216 A1    Apr. 28, 2011

(51) Int. Cl.
F16K 1/00    (2006.01)

(52) U.S. Cl. .......................................... 137/883; 251/334

(58) Field of Classification Search .................. 137/883; 251/334, 359, 83; 5/710, 713

See application file for complete search history.

(56) References Cited

U.S. PATENT DOCUMENTS

| | | | | | |
|---|---|---|---|---|---|
| 2,059,111 | A | * | 10/1936 | Joyce | 251/86 |
| 3,462,115 | A | * | 8/1969 | Barker | 251/29 |
| 4,296,307 | A | * | 10/1981 | Hagihara | 219/121.14 |
| 5,011,116 | A | * | 4/1991 | Alberts et al. | 251/334 |
| 5,605,173 | A | * | 2/1997 | Arnaud | 137/7 |
| 2006/0236464 | A1 | * | 10/2006 | Beck et al. | 5/713 |

* cited by examiner

*Primary Examiner* — Eric Keasel
*Assistant Examiner* — Kevin E Lynn
(74) *Attorney, Agent, or Firm* — Paul C. Oestreich; Eminent IP, P.C.

(57) ABSTRACT

A valve assembly controls the flow of fluid at very low pressures of about 5 psi or less to and from inflatable chambers. Each valve assembly has a plurality of valves that operate between a closed and an open position. A first conduit or channel directs the fluid to each of the valves; and a plurality of second conduits each associated with one of the plurality of valves communicates with an inflatable chamber. Each of the valves has a valve seat and a valve stem with a head that seats on or with the valve seat to effect a seal in the closed position. The valve stem has a portion positioned to be moved by the solenoid when activated. The separate valves also act as relief valves. A vent valve is also provided and configured to operate between open and closed positions.

12 Claims, 10 Drawing Sheets

LOW PRESSURE VALVE ASSEMBLY

BACKGROUND

1. Field

The present invention relates to a valve assembly that is used to inflate and deflate a inflatable chamber with a low pressure inflation fluid and more particularly to a multi-chambered valve assembly for inflating and deflating a plurality of inflatable chambers with a gas like air.

2. The Relevant Technology

A number of products used to support a person are configured with multiple chambers that are inflatable with a low pressure fluid like air at room temperature. Some of the chambers have at least one side wall constructed of a flexible material. Some have multiple side walls constructed of a flexible material. The chambers may be in any number of different geometric shapes and sizes and generally have a volume of less than about 1 cubic foot when normally inflated and not supporting a user.

The inflatable chambers can feel "soft" or "hard" to the touch based on the pressure of the inflation fluid (e.g., air). Only a small change (e.g., 0.1 pounds per square inch) in the inflation pressure results in a change between the a "soft" feel and a "hard" feel. One such product is a medical bed and more specifically, an inflatable mattress that is constructed to have multiple chambers. Each of the multiple chambers can be selectively inflated and deflated. U.S. Pat. No. 7,219,380 (Beck, et al.) discloses such a bed.

Other products may also be constructed to have multiple inflatable chambers in which a small change in the fluid pressure results in a change in the feel between "hard" and "soft" such as a wheel chair, a chair, an operating room table, and any other support structure having inflatable chambers and used to support a human.

SUMMARY

A valve assembly is provided for use with system for supporting a body positioned a support surface having at least one inflatable chamber. The valve assembly includes a valve housing having a first conduit means and second conduit means. The first conduit means is configured to receive from and to supply fluid at a low pressure to exterior the valve housing. The second conduit means is configured for connection to said at least one inflatable chamber of the support surface to receive there from and to supply thereto the low pressure fluid.

The valve means of the valve assembly is positioned in the valve housing and connected to receive and supply the low pressure fluid from and to the first conduit means. The valve means is also connected to receive and supply the low pressure fluid from and to the second conduit means. The valve means is operable between an open position in which the low pressure fluid is flowable between the first conduit means and the second conduit means and a closed position in which the flow of the low pressure fluid between the first conduit means and the second conduit means is inhibited.

The valve assembly also has solenoid means positioned in the valve housing and connected to operate the valve means between the open position and the closed position. The solenoid means also is connectable to a remote source of operating signals which are supplied to cause the solenoid means to operate to move the valve means between the open position and the closed position.

In a desired configuration, the valve means has a valve seat that registers with the head of a valve stem to effect a seal. Preferably, the valve stem has a hollow core with a resilient material therein. More preferably, the valve seat is urged into the resilient material to effect the seal. A spring is also positioned to urge the valve stem against the valve seat in the closed position.

In another preferred arrangement, the valve assembly has a valve housing with a first channel and a plurality of second channels. The first channel is configured to receive from and to supply fluid at a low pressure to exterior the valve housing. That is, it may be connected to a source of low pressure air and to a vent. Thus, the valve assembly is operable to allow fluid such as air to be supplied from an exterior source or to be vented. Each of the plurality of second channels is configured for connection to one or more of the plurality of inflatable chambers to receive there from and to supply thereto the low pressure fluid. The preferred arrangement includes a plurality of valves each positioned in the valve housing. Each of the plurality of valves is connected to receive and supply the low pressure fluid from and to the first channel; and each of the plurality of valves is connected to receive and supply the low pressure fluid from and to one of the plurality of second channels. Each of the plurality of valves being operable between an open position in which the low pressure fluid is flowable between the first channel and one of the plurality of second channels and a closed position in which the low pressure fluid flows between the first channel and one of the plurality of the second channels.

The preferred assembly also has a plurality of solenoids each positioned in the valve housing and each connected to operate one of the plurality of valves between its open position and its closed position. Each of the solenoids is connectable to a remote source of operating signals to cause each of the solenoids to operate its valve between the open position and the closed position.

In a more preferred arrangement each of the plurality of valves has a valve seat with an aperture for the fluid to flow there through. The aperture is in communication with the first channel. In yet a further preferred configuration, each of the plurality of valves has a valve stem with a portion configured for positioning relative to the solenoid for movement by the solenoid. Each valve has a valve stem having a valve head configured for sealing the aperture when that valve is in its closed position.

In more preferred arrangements, the valve seat is circular in projection and formed to have a circular edge. The valve stem has a bore formed therein which is filled with a filler made of an elastically deformable material. The bore is arranged to register with and deformably receive the circular edge into the filler when the valve is in its closed position. Desirably, the valve assemblies have a plurality of springs each positioned to urge one of the plurality of valves toward its closed position.

In even more preferred arrangements, the valve assembly includes a first connector attached to the valve housing for connecting an exterior conduit to the valve housing for communication of fluid to and from the first channel. Desirably, the valve assembly includes a second connector attached to the valve housing for connecting the first conduit to a first conduit of another valve assembly. Alternately, the valve assembly also includes a plurality of third connectors each attached to the valve housing and each for communication with one of the plurality of second channels. Desirably, each of the second channels has a plenum formed in the valve housing to be proximate of the valve seat. Each of the second channels also has a conduit for communicating the low pressure fluid to and from the third connector.

In highly preferred arrangements, the low pressure fluid is under about 5 pounds per square inch more preferably about 0.5 pounds per square inch. The filler is preferably silicon or a silicon-like material. In highly preferred configurations, the valve assembly contains four or 6 solenoids.

Various embodiments of the present invention are set forth in the attached figures and in the detailed description of the invention as provided herein and as embodied by the claims. It should be understood, however, that this Summary does not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

To further clarify the above and other advantages and features of the one or more present inventions, a more particular description is provided by reference to specific embodiments that are illustrated in the appended drawings. It is appreciated that these drawings depict only typical embodiments of the invention and are therefore not to be considered limiting of its scope. Embodiments will be described and explained with additional specificity and detail through the use of the accompanying drawings in which.

DETAILED DESCRIPTION

Reference will now be made to one or more embodiments of the one or more present inventions, examples of which are illustrated in the accompanying drawings. The various exemplary embodiments illustrate a valve assembly which may be used with a structure that has an inflatable chamber that is filled with a low pressure fluid such as air.

Figure 1:
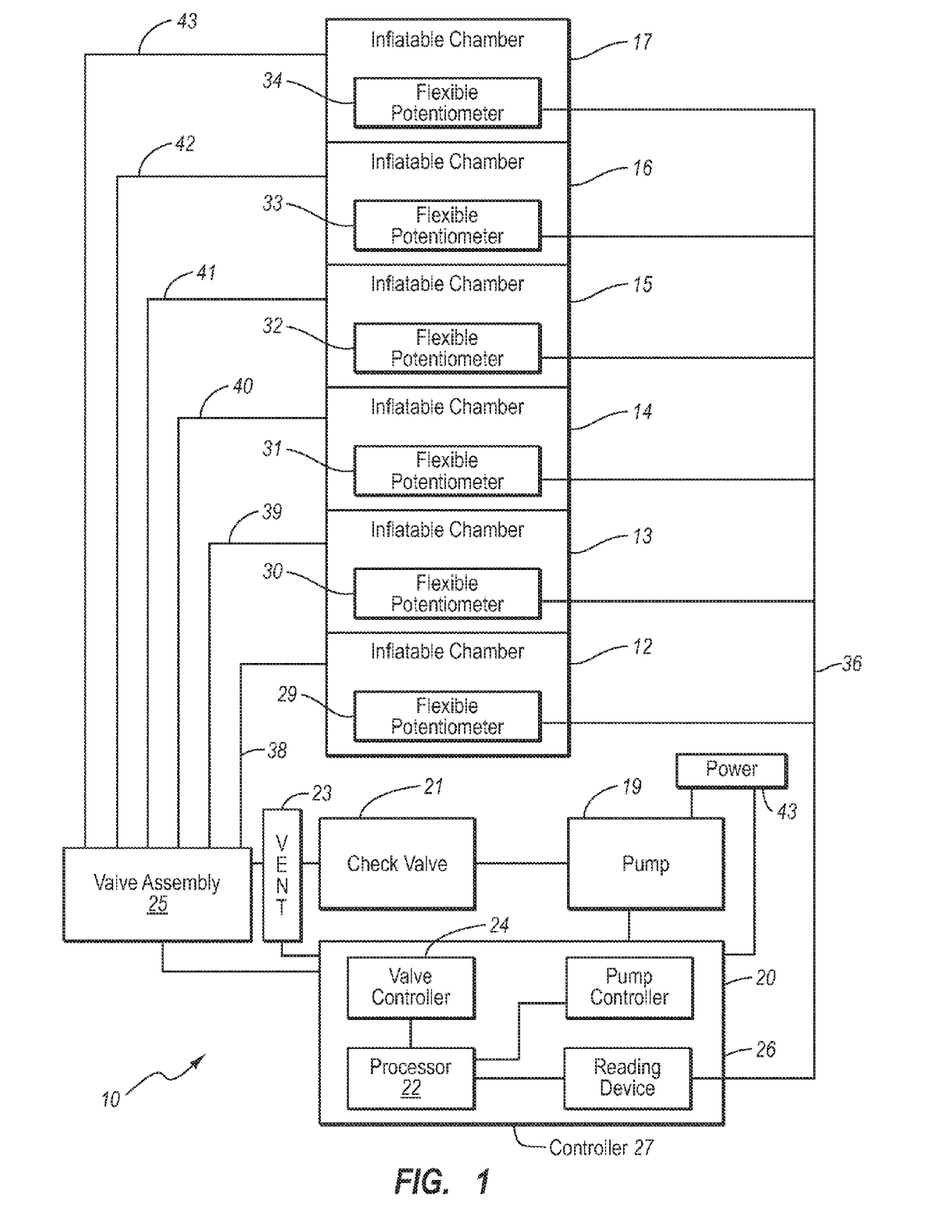
FIG. 1 is a block diagram depicting an inflatable system of the present invention.

Referring now to FIG. 1, the valve assembly of the present invention is for with or as part of a system 10 that has at least one and, as here shown, optionally a plurality of inflatable compartments or chambers 12-17 configured to be supplied with an pressurized fluid from a pumping system 19. The pumping system 19 is configured to supply a low pressure fluid (like air or some other suitable gas) under at a low pressure (e.g., 0.5 pounds per square inch) through a check valve 21 and a vent valve 23 to a valve assembly 25 that is connected to supply the low pressure fluid to the several inflatable chambers 12-17. The pumping system 19 is operated by a controller 27 that has a pump controller 20, a valve controller 24, a processor 22 and a reading device 26 all interconnected. The reading device 26 is connected to a plurality of sensors 29-34 such as flexible potentiometers (See e.g., U.S. Pat. No. 5,157,372, Langford) which supply signals via conductor 36 reflective of the inflation status of the several compartments 12-17. In turn, the controller 27 generates signals to operate the pumping system 19 and the valve assembly 25 to direct the low pressure fluid to the desired inflatable compartment 12-17 via suitable tubes 38-43.

The valve assembly 25 is operated by the controller 27 for the introduction to and venting of a fluid (such as air) with a selected inflatable chambers 12-17 upon receipt of a deflection signal from the flexible potentiometers 29-34. Although six inflatable chambers are shown in FIG. 1, any number of inflatable chambers may be used depending upon the needs of a particular inflatable system. The valve controller 24 of the controller 27 controls the operation of valve assembly 25 by sending a series of signals to the valve assembly 25 to perform various mechanical operations, such as selecting one or more inflatable chambers 12-17 for inflation or deflation. By way of example and not limitation, inflatable chambers 12-17 may be inflated and later deflated by aligning the valve assembly 25 and first supplying fluid through the check valve 21 via the vent valve 23 to the inflatable chambers 12-17. If for some reason one or more chambers becomes over pressurized, the fluid can be vented by operating one or more of the valves in the valve assembly 25 and the vent valve 23. Pump controller 20 controls the duration of the flow of fluid, such as air, from fluid source or pumping system 19 to any one or more of inflatable chambers 12-17 by providing a signal to the pumping system 19 to introduce pressurized fluid to the valve assembly 25. The fluid source or pumping system 19 may be a mechanical pump as well as a reservoir, such as a tank, that contains pressurized fluid, such as pressurized air. Reading device 26 receives a deflection signal from flexible potentiometers 29-34 to determine the location and amount of deflection of each of the inflatable chambers 12-17, respectively. The controller 27 then directs the valves within the valve assembly 25 to remain unchanged, or to move to the appropriate position to either allow pressurized flow to its associated inflatable chamber 12-17, or to allow the valve's associated inflatable chamber 12-17 to deflate through the vent valve 23.

In a preferred embodiment, controller 27 is embodied in any suitable programmable integrated circuit such as M30262 manufactured by Renesas. However, any suitable programmable integrated circuit may be used to supply operating commands that control the operation of valve assembly 25 and pumping system 19, as well as receive deflection measurements from flexible potentiometers 29-34 located at a surface of inflatable chambers 12-17. For example, controller 27 may be embodied in an ASIC, or similar application specific integrated circuit.

Processor 22 preferably comprises any computer processor capable of executing a series of instructions to access data. It interfaces with the valve controller 24, pump controller 20 and the reading device 26 to issue suitable commands and to receive feedback as appropriate. For example, processor 22 may contain instructions for selecting certain inflatable chambers 12-17 or inflation or deflation based on deflection information received from flexible potentiometers 29-34. Processor 22 may also contain instructions for randomly selecting inflatable chambers 12-17 for inflation and deflation in a particular pattern.

In the illustrated embodiment, fluid source or pumping system 19 is coupled to the valve assembly 25 through a check valve 21. However, pumping system 19 may be coupled directly to the valve assembly 25 by a suitable tube or through any number of intervening devices such as a flow meter. Check valve 21 preferably has a crack pressure of 0.15 psi, which prevents back flow through to the pumping system 19. By way of example and not limitation, pumping system 19 is preferably sized to provide at least ½ pound per square inch of pressure in inflatable chambers 12-17. A suitable commercial model is a 110 VAC model #DDL15B-101, 23 L/m linear diaphragm pump manufactured by Gast that outputs approximately 5 pounds per square inch of pressure. However, any suitable fluid source or pump may be used that is sized in accordance with the particular requirements of the inflatable support system.

One or more power sources 43 are used to provide power to the pumping system 19, controller 27, and any other elements in FIG. 1 requiring power. The power source may be AC or DC with appropriate conversion devices, as required. Lines showing the deliver of power to other components have not been shown for simplicity.

Figure 2:
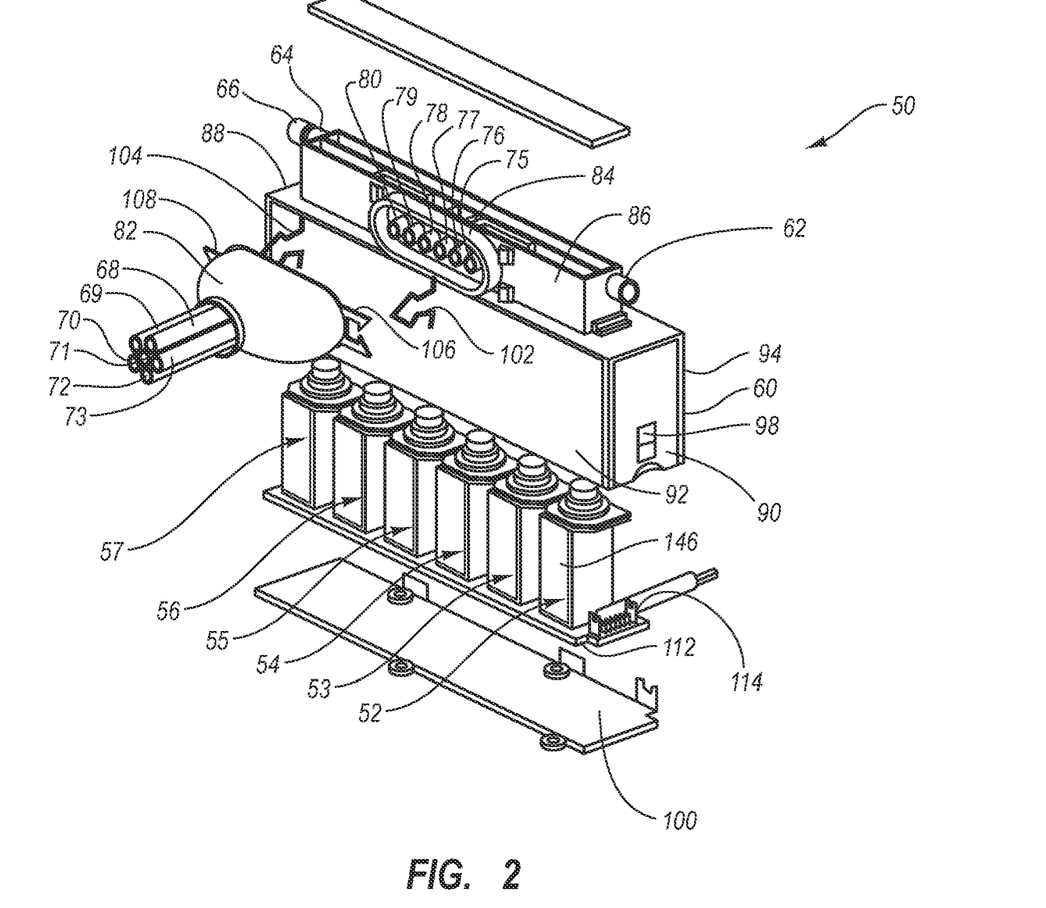
FIG. 2 is an exploded perspective view of a valve assembly of the present invention.

FIG. 2 depicts in perspective one embodiment of a valve assembly 50 suitable for use as valve assembly 25 in FIG. 1. The valve assembly 50 has a plurality of separately controllable solenoid valves 52-57 each comparable to the solenoid valve 58 shown in FIG. 3. The valve assembly 50 of FIG. 2 includes a housing 60 that includes an intake port 62 to intake fluid and an alternate intake port 64 that is shown closed with a cap 66. That is, fluid such as air is supplied to the housing 60 through the intake port 62 or alternate intake port 64.

The valve assembly 25 is also connected to a plurality of fluid tubes 68-73 that function comparable to fluid conduits 39-43 (FIG. 1) to supply the fluid to inflatable chambers like chambers 12-17. As shown in FIG. 2, the fluid tubes 68-73 connect internally to each separate solenoid valve 52-57 through chamber ports 75-80 and suitable internal structure. The tubes 68-73 and are held together and connected to the chamber ports 75-80 by a suitable connector 82 that mates with a receptacle 84 on the cover or top panel 86.

The housing 60 has ends 88 and 90, as well as sides 92 and 94. While the housing 60 is shown to be a combination of several parallel-piped shapes, it may also be in other shapes or forms to accommodate the design of the products involved. It may be noted that a suitable detent (not shown) and a flexible snap connector 98 are provided for effecting a secure but removable mechanical connection of the base 100 to the housing 60. Of course, any other means to effect a mechanical association desired by the user will suffice.

The top panel 86 is affixed to the housing 60 by any suitable means to effect a secure but removable connection sufficient to withstand the forces to effect repeated connection and disconnection of the connector 82. In the arrangement of FIG. 2, the top panel 86 is held in place by screws that are positioned through strengthened receptacles not here shown.

The connector 82 is removably held in place in a connected relationship with receptacle 84 by any means that permits the connector 82 to be held securely in place and easily removed. In FIG. 2 the receptacle 84 has snap connectors 102 and 104 that each interface with a lip 106 and 108 on the connector 82 to effect a secure mechanical connections that are easily operated by a user in a well known fashion.

Figure 3:
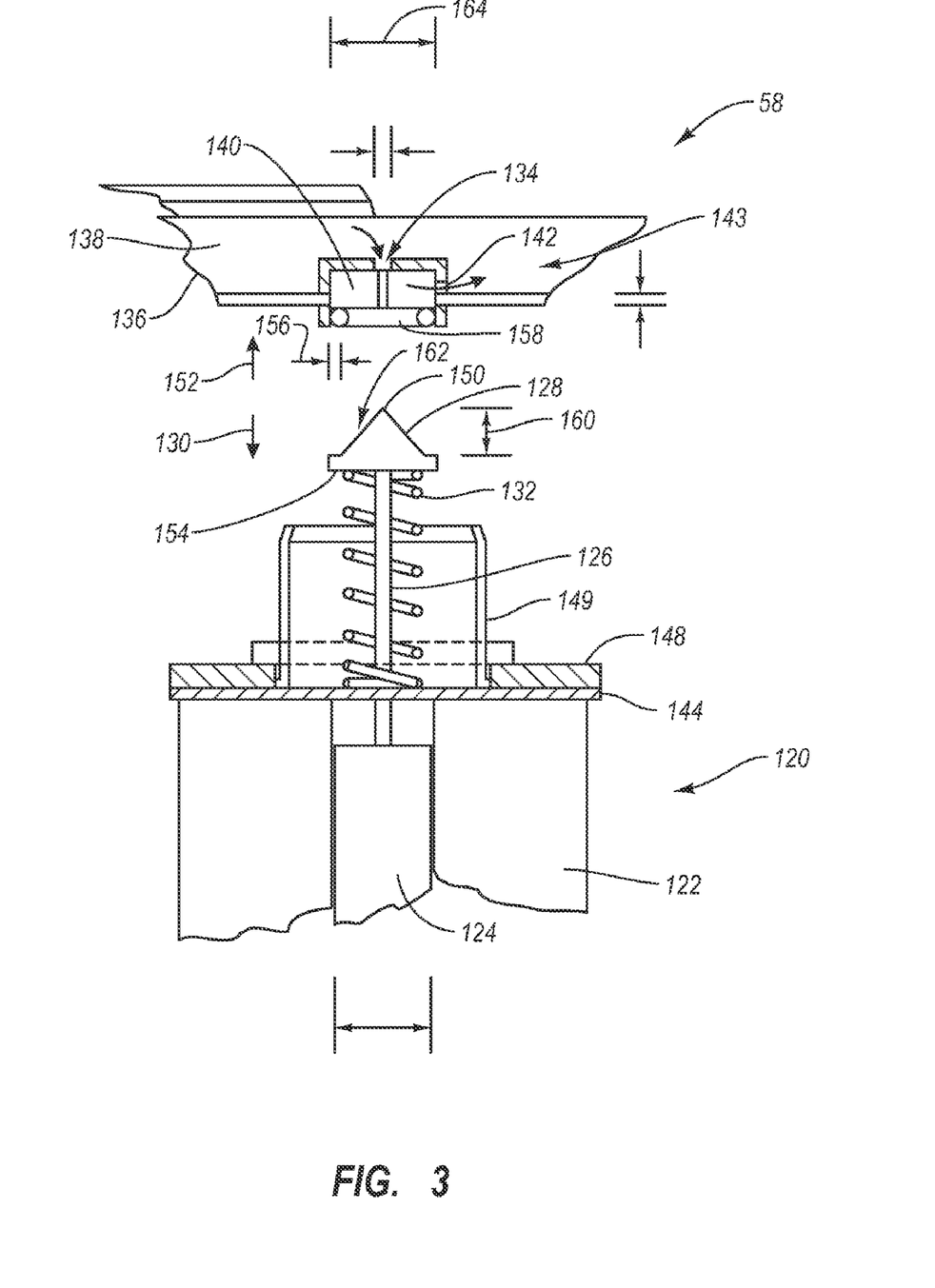
FIG. 3 is a partial cross sectional exploded view of a valve of a valve assembly of the present invention.

The solenoid valves 52-57 that are in and that include the housing 60 use actuators comparable to actuator 110 of FIG. 3 all positioned within the housing 60. The housing 60 acts as a protector and as an insulator. The housing 60 also has a base 100 that holds the solenoid valves 52-57 inside. The solenoid valves 52-57 are mounded to a circuit board 112 which has conductors that transmit electrical signals to the individual solenoid valves 52-57 to cause each of them to separately actuate. A suitable electrical connector 114 is shown for receiving a connector for electrical connection to a suitable controller like controller 27 (FIG. 1).

Turning now to FIG. 3, the solenoid valve 58 is depicted in cross section to better illustrate the relationship of the components. The solenoid valve 58 has a solenoid 120 what is cylindrical with a stator 122 that receives electricity to create a magnetic field that interacts with the armature 124 to move the armature 124 and, in turn, the valve stem 126 and valve head 128. In FIG. 3, the stator 122 is activated electrically by a controller to create a magnetic field to cause the armature 124 to move down 130 thereby compressing spring 132 and removing the valve head 128 from the aperture or opening 134 in the interior of the housing 136 which is comparable to housing 60 (FIG. 2). The housing 136 has been formed to have multiple chambers that includes an inlet plenum 138 that is receiving fluid from a source (e.g., a pump) through intake port like intake port 62 (FIG. 2). From the inlet plenum 138, the fluid passes through the opening 134 into an interior plenum 140 which is in communication with a suitable outlet such as outlet 142 and then through a discharge plenum 143 to a discharge port like port 75 in FIG. 2. It may be noted, that the opening 134 and the opening 142 are each typically a round hole and sized to regulate the flow of the fluid (like air) there through. The fluid is then supplied under low pressure through the conduits like tubes or conduits 68-73 (FIG. 2) to a suitable inflatable chamber 12-17 (FIG. 1).

The solenoid 120 of FIG. 3 has a solenoid bracket 144 that is comparable to similar brackets like bracket 146 in FIG. 2. An insulating spacer 148 is made out of a suitable non conductive material like plastic; and it is positioned as a spacer and to provide for a snug fit for the stator 122 within the bracket 144. A hollow housing 149 extends upward from the insulating spacer 148. The hollow housing 149 is cylindrical and has within it the valve stem 126 and the compressing spring 132. The hollow housing 149 protects and guides the valve stem 126 and the compressing spring 132. The valve head 128 is here shown to be conical in shape with a tip 150 that is positioned to register with and close the opening 134 when the solenoid 120 is deactivated. That is, when the solenoid 120 is deactivated, the compressing spring 132 urges the valve head 128 upward 152 into registration with the opening 134 to close the opening 134. The valve head 128 has a collar 154 having a width 156 selected so that it engages an "o" ring 158 of about the same width 156 to effect a seal with the interior plenum 140. The height 160 of the valve head 128 is selected so that the tip 150 seals the opening 134 while the collar 154 engages the "o" ring 158. A double seal is thereby effected. Of course, when the solenoid valve 58 opens, the valve head 128 moves down 130 so that the fluid may come through the opening 134 and pass through a discharge port 142 into a discharge plenum 143. The discharge port 142 is formed to be larger in cross section than the opening 134 so that the discharge port 142 does not restrict flow.

As noted, the fluid such as air in the inlet plenum 138 is at a pressure typically less than 5 psi and, in this embodiment, less than 1.0 psi. Preferably the fluid is at a pressure of around 0.5 psi. This is a very low pressure so that the amount or volume of air that flows through the hole or opening 134 is relatively small and at a relatively low flow rate. Thus, the risk of plugging the hole with dirt or even ice is reduced because the drop in pressure due to the venturi effect is relatively small.

It may also be noted that the solenoid valve 58 of FIG. 3 is normally closed. That is, when there is no electrical power supplied to the stator 122, there is no magnetic force or field to move the armature 124. In turn, the compressing spring 132 urges the valve stem 126 and valve head 128 into a closed position to close the solenoid valve 58. Thus, a loss of electrical power causes the solenoid valve 58 to close and maintain the status quo until electrical power can be restored.

The solenoid valve 58 is also a safety valve. The pressure of the fluid in the discharge plenum 143 and in turn in the inflatable chamber like chambers 12-17 (FIG. 1) is pressing down on the effective surface 162 of the valve head 128 having a diameter 164. The compressing spring 132 must have sufficient strength or hold the solenoid valve 58 closed with the pressure of the fluid in the chambers 12-17 (FIG. 1) above normal expected pressures. In the illustrated embodiment, a pressure of 10 psi in the discharge plenum 143 means that the force needed to hold the valve head 128 in place in the closed position must be about over 2 pounds. Notably, if someone were to, for example, jump on an inflatable chamber like one or more of the chambers 12-17 (FIG. 1) or suddenly place a huge weight on a chamber, one could experience a spike in pressure that could damage the inflatable chamber like chambers 12-17. However, with a valve structured as in FIG. 3, a spike in pressure above a pressure that could cause damage (e.g., above 10 psi) will force the valve head 128 down 130 and open the discharge plenum 143 to the inlet plenum 138 of the valve. Thus, the fluid pressure will be released to the inlet plenum 138 of the solenoid valve 58 which, in turn, provides a greater volume to minimize the pressure spike and/or which allows the fluid to escape through a vent valve or around a connector at an intake port like intake port 62 to the atmosphere. Thus, the solenoid valve 58 in effect acts as a safety valve.

Figure 4:
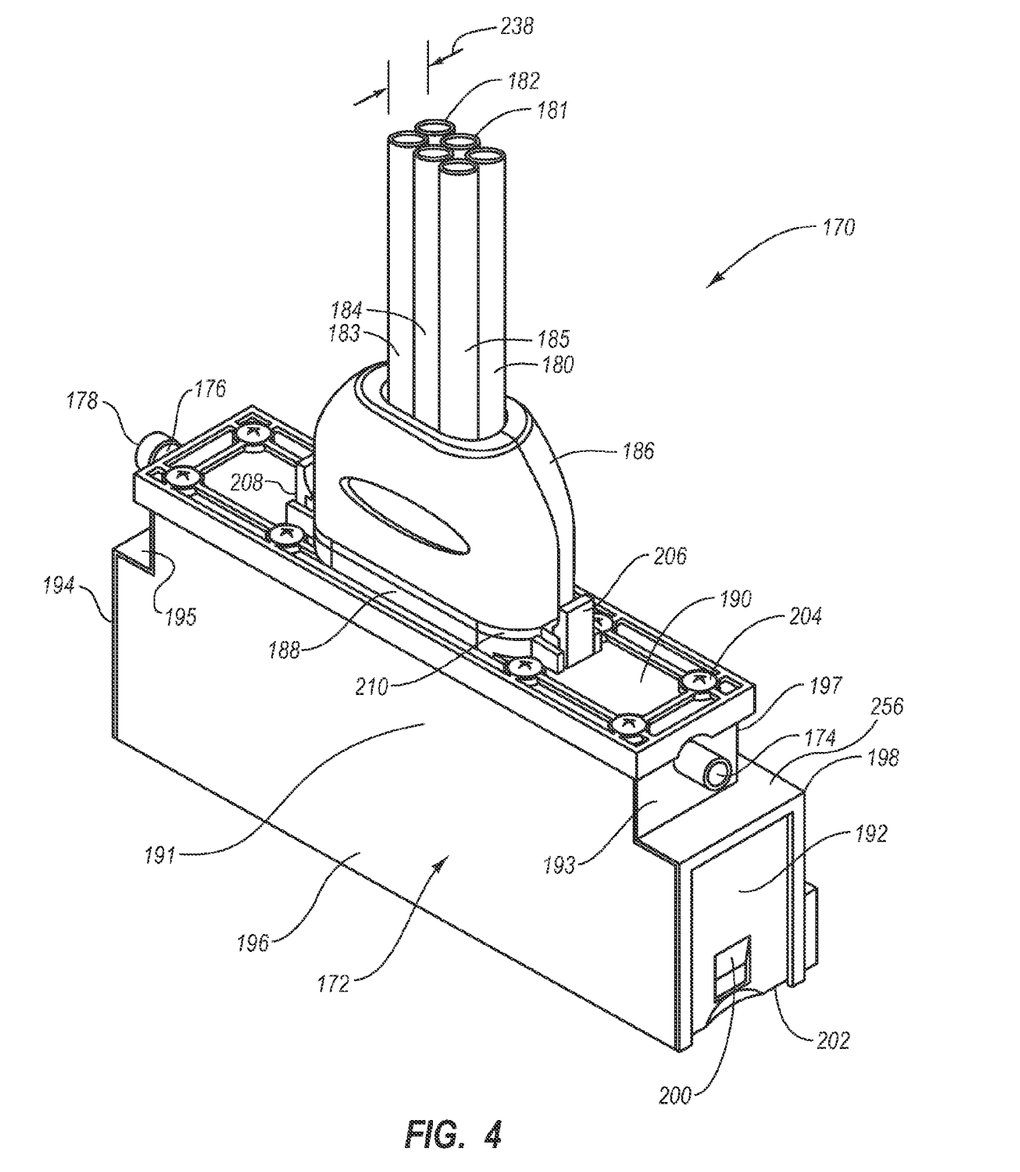
FIG. 4 is. is a perspective view of an alternate valve assembly of the present invention.

Turning to FIG. 4, an alternate valve assembly 170 is shown in perspective has a housing 172 that contains a plurality of separately controllable solenoid valves comparable to the solenoid valve 58 of FIG. 3. The housing 172 includes a fluid port 174 to intake low pressure fluid and an alternate port 176 that is shown closed with a cap 178. That is, fluid is supplied to the housing 172 through either port 174 and 176 and may be connected to other valve assemblies through the other port.

The valve assembly 170 is also connected to a plurality of fluid tubes 180-185 that function comparable to fluid conduits 38-43 (FIG. 1) and tubes 68-73 (FIG. 2) to supply the fluid to the inflatable chambers like chambers 12-17 (FIG. 1). The fluid tubes 180-185 connect internally to each separate solenoid valve like solenoid valve 58 through suitable internal structure as better seen in FIG. 5 and are held together by a suitable connector 186 that mates with a receptacle 188 on the cover or top panel 190. The housing 172 has ends 192 and 194, as well as sides 196 and 198. While the housing 172 is shown to be a combination of several parallel-piped shapes, it may also be in other shapes or forms to accommodate the design of the products involved.

It may be noted that a suitable detent and a flexible snap connector 200 are provided for effecting a secure but removable mechanical connection of the base 202 to the housing 172. Of course, any other means to effect a mechanical association desired by the user will suffice.

The top panel 190 is affixed to the housing 172 by any suitable means to effect a secure but removable connection sufficient to withstand the forces to effect repeated connection and disconnection of the connector 186. In this arrangement, the top panel 190 is held in place by a plurality of screws like screw 204. The screws 204 are positioned through strengthened screw supports to extend into suitable plastic receptacles (not shown) in the housing 172.

The connector 186 is removably connected to a receptacle 188 and held in place by any means that permits the connector 186 to be held securely in place and easily removed. In FIG. 4, the receptacle 188 has snap connectors 206 and 208 that move relative to lip or rim 210.

Figure 5:
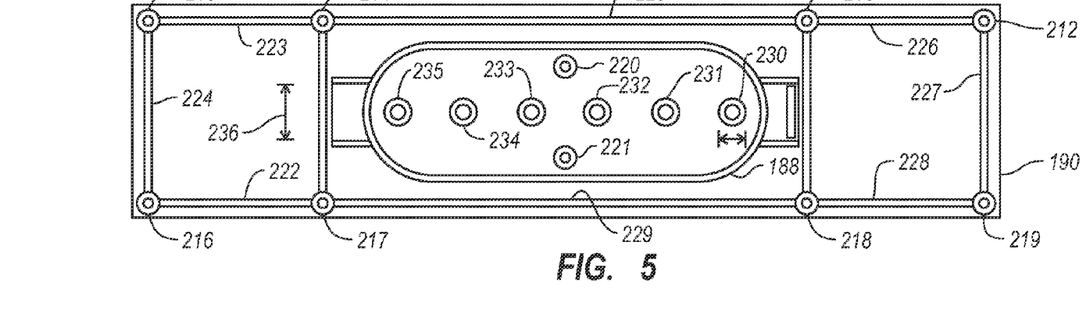
FIG. 5 is a simplified enlarged view of the top of the valve assembly of FIG. 4.

The cap or top panel 190 of the valve assembly 179 of FIG. 4 is shown in greater detail and is enlarged over actual size in FIG. 5. The top panel 190 includes a plurality of screw receptacles 212-221 each having a predrilled aperture with stiffeners 222-229 are shown extending between the several receptacles 212-219 to strengthen the top panel 190 and minimize or reduce the risk of cracking upon assembly of the top panel 190 to the housing 172 as discussed hereinafter.

The top panel 190 is shown with the receptacle 188 having 6 exit ports 230-235 each cylindrical in shape and sized in diameter 236 (e.g., about 3.5 millimeter) to snuggly either receive an elastically deformable plastic tube to mate with the exit ports 230-235. The plastic tubing (e.g., TYGON® tube) if used is suitably sized (e.g., about 6 millimeters outside diameter and about 3 millimeter inside diameter) to transmit the fluid between the valve assembly 170 and the inflatable chambers such as chambers 12-17 (FIG. 1). The inside diameter 238 of the tubing 180-185 may be changed base on the requirements of a given application.

Figures 6, 7, 8, 9:
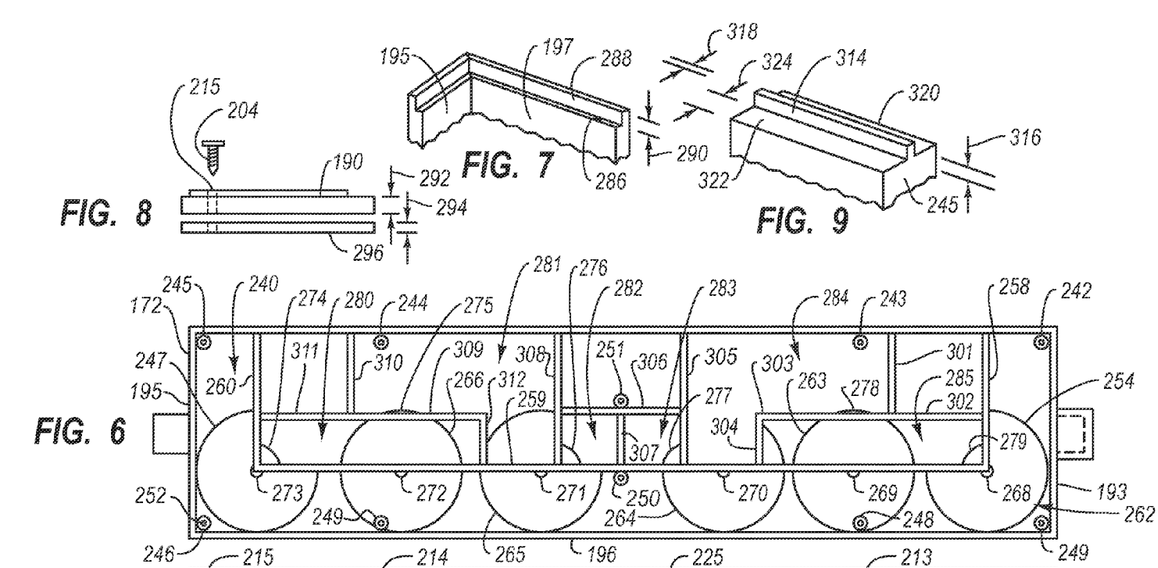
FIG. 6 is a simplified enlarged view of the upper portion of the housing of the valve assembly of FIG. 4 with the top of FIG. 5 removed.
FIG. 7 is a partial perspective view of a portion of the housing of the valve assembly of FIG. 4.
FIG. 8 is a partial side view of the top of the housing and a related gasket for use with the valve assembly of FIG. 4.
FIG. 9 is a partial perspective view of a portion of the housing of the valve assembly of FIG. 4.

The upper portion 191 of the housing 172 in FIG. 6 is sized to receive the top panel 190 with screw receptacles 242-251 each having a screw receiving bore like bore 252 so the top panel 190 can be properly fastened to the upper portion 191 and, in turn, to the housing 172. The housing 172 has an inlet plenum 240 formed in part by a floor 254 which is an extension of the surface 256 of the lower portion of the housing 172. The inlet plenum 240 is also formed in part by exterior walls 193, 195, 196 and 197 and interior walls 258, 259 and 260. The inlet plenum 240 is further formed by the top panel 190 when it is secured in place. Raised cylindrical portions 262-267 each extend upward a distance of about 5 to 10 mm from the floor 254 similar to the portion. Each of the raised cylindrical portions 262-267 have a central aperture 268-273 each formed to register with the tip of the valve head comparable to tip 150 of valve head 128 in FIG. 3. The apertures 268-273 are each in communication with the inlet plenum 240 to receive pressurized fluid there from. When a valve head is in an open position, the pressurized fluid passes from the inlet plenum 240 through the related aperture of the apertures 268-273. The pressurized fluid then proceeds into and through its respective outlet of the outlets 274-279 which are in fluid communication with a separate plenum or chamber 280-285 that align with one of the exit ports 231-235. In turn, when all the valve heads are in their open position, pressurized fluid passes from the inlet plenum 240 through respective apertures 268-273 and into their respective ports 274-279, then into their respective chambers 280-285 and then exit ports 230-235.

The outer walls 193-195, 196 and 197 are formed to have a ledge 286 formed and sized as shown in FIG. 7. The ledge 286 has back 288 that has a height 290 to accommodate the thickness 292 of the top panel 190 and the height or thickness 294 of the gasket 296 so that when the gasket 296 and the top panel 190 are assembled using screws like screw 204 that extend through apertures like screw receptacle 215 into aperture 245. As seen in FIG. 8, the gasket 296 and top panel 190 are sized to fit snuggly into the notch formed by the ledge 286 and back 288.

As the gasket 296 is urged against the ledge 286 to effect a seal, the separate interior walls 258, 259 and 260 as well as walls 301-312 are shaped to effect a seal with the gasket 296. As seen in FIG. 9, the top of the separate interior walls 258, 259, and 260 as well as walls 301-312 each are formed to have a ridge 314 having a height 316 of about 0.5 millimeters and width 318 of about 0.5 millimeters. The ledges 320 and 322 each have a width 324 of about 0.5 millimeters. Thus, the ridge 314 presses into the gasket 296 which is made of an elastically deformable material such as a closed sell neoprene. The ridge 314 is sized so that when the top panel 190 is properly installed, the ridge 314 is urged against the gasket 296 and presses into the gasket 296 to form a seal.

Figure 10:
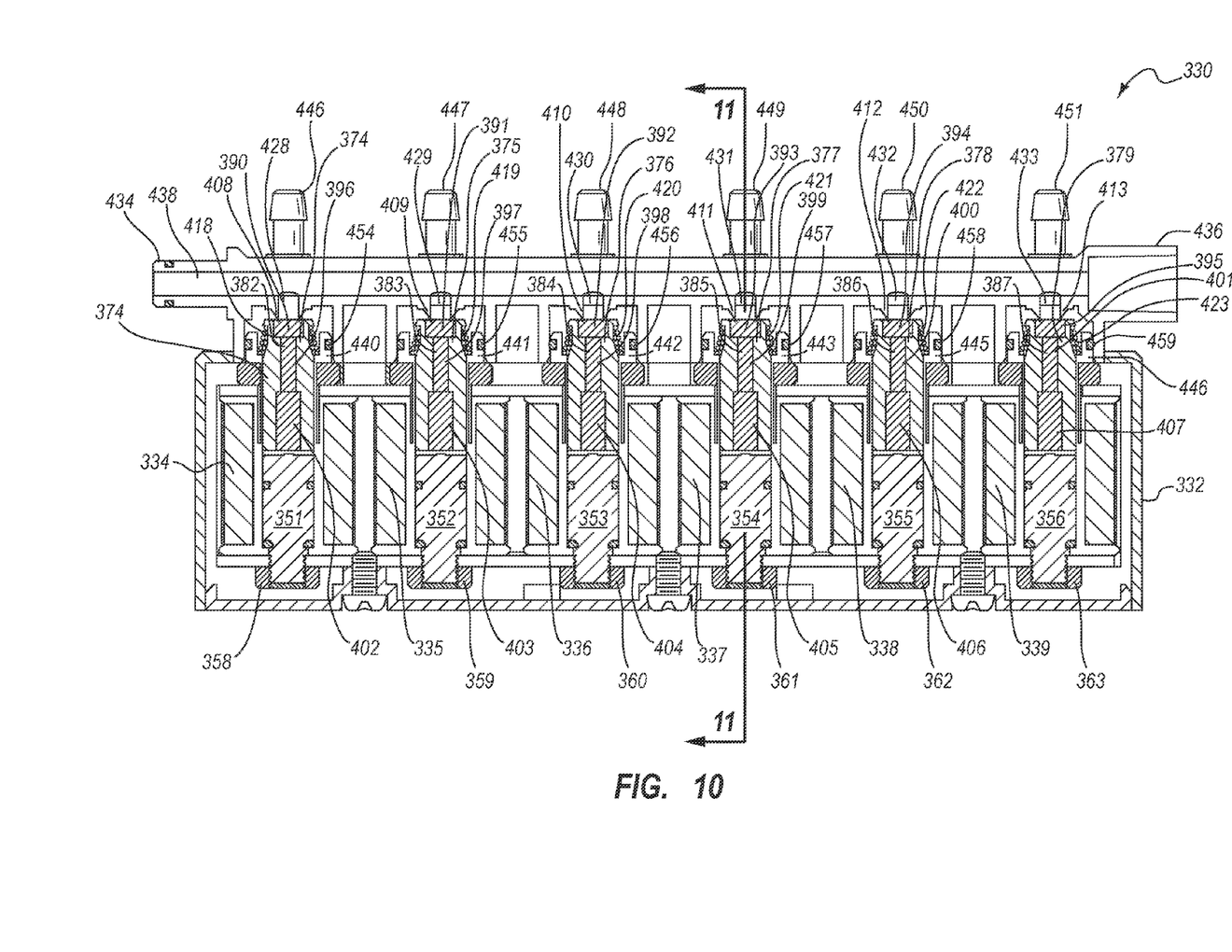
FIG. 10 is an alternate cross sectional side view of a valve assembly for use in the system of the present invention.
Figure 11:
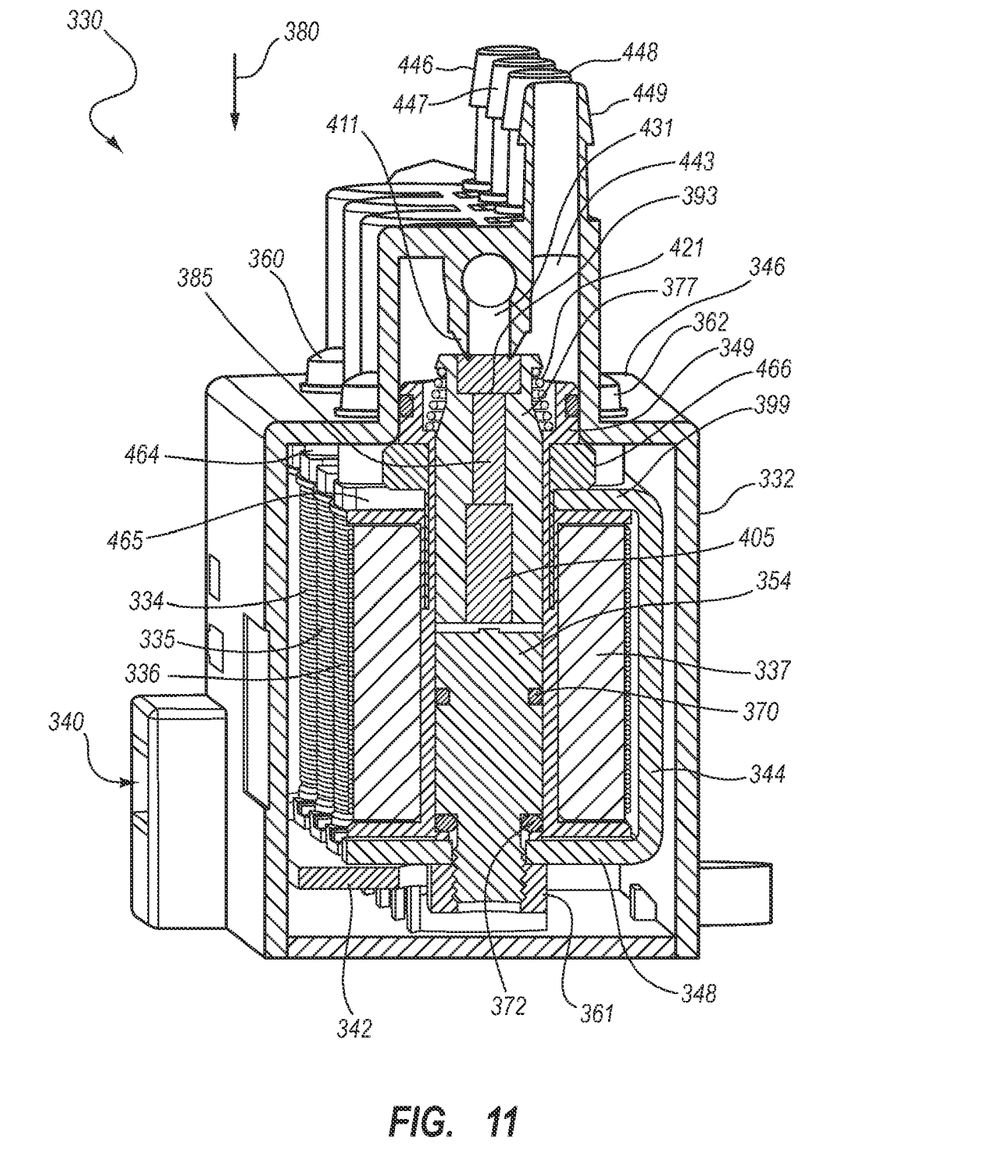
FIG. 11 is cross sectional perspective view of the valve assembly of FIG. 10 taken at section lines 11-11.

Referring now to FIGS. 10 and 11, an alternate form of valve assembly 330 is depicted having a housing 332 within which are positioned a plurality of solenoid valves for porting fluid such as low pressure air to and from the separate inflatable chambers like chambers 12-17 of FIG. 1. The solenoid valves each have a solenoids has a coil or armature 334-339 that is powered electrically. That is, electrical power is delivered from a suitable source through a connector 340 to the separate armatures 334-339 through conductors formed on a suitable printed circuit board 342. The armatures 334-339 are placed in a C-shaped bracket 344 that has a top member 346 and a bottom member 348. Within each armature 334-339 is a core stabilizer 351-356 that is sized to snuggly fit within a core channel 364-368. Each stabilizer 351-356 has a threaded extension to which a nut 358-363 is affixed to hold the stabilizer 351-356 in place attached to its respective C-shaped bracket like C-shaped bracket 344. The stabilizers 351-356 are sized to fit snuggly in their respective core channels 364-368 and are sealed in place by O-rings like O-rings 370 and 372.

Above each stabilizer 351-356 is a separate and movable core 374-379. Each core 374-379 is a cylinder formed from a suitable metal that is of the type that can be moved by a magnetic force generated by the armatures 334-339. Each of the armatures 334-339 are configured to urge its respective core 374-379 downward 380 toward their respective stabilizers 351-356.

Each core 374-379 has a central section 382-387 that is milled out and filled with a filler 388 that is elastically deformable and essentially inert such as silicon or rubber, teflon (polytetrafluoroethethylene), nylon and various polyethylene terephthalate (PET) materials.

As can be seen in FIGS. 10 and 11, the central section 382-387 of each core 374-379 has an upper large diameter portion 390-395, a narrow or thin diameter portion 396 and a lower large diameter portion 402-407. When the filler 388 is poured into the central section 382-387 of each core 374-379, it sets up and when solidified, cannot be easily pushed out of the central section 382-389 because the different diameters create ledges or shoulders that act to restrict the movement of the filler 388.

Each core 374-379 is urged against a valve seat 408-415 that may be flat and sized in diameter 414 (FIG. 12) to be less than the diameter 416 of large diameter portion 390-395 of the filler 388. The cores 374-379 are each urged toward their respective valve seats 408-413 by a respective spring 418-423. If the surface of the valve seat 408-413 is flat, it will be urged into the filler 388 which will deform sufficiently to effect a seal. Preferably, the valve seats 408-413 have a circular edge like edge 426 that is somewhat sharp. In turn, the valve seats 408-413 are more easily urged into and farther into the filler like filler 388 to effect a better, tighter seal with the filler 388 deforming into a kind of notch 424 as seen in FIG. 12.

The fluid such as air is supplied to the valve assembly 330 from an external source through one of two ports 432 and 434. The fluid then proceeds through the line 436 to the valve seats 408-413 through channels 428-433. When an armature like armature 337 is activated, its respective core 377 is urged down 380 with strength to over come the force of the spring 421 to in turn cause the valve to open and port the fluid like low pressure air from the line 436 into its respective plenum 440-445 which is in direct communication with its respective outlet ports 446-451. Suitable tubes like TYGON® tubes are connectable to the outlet ports 446-451 to supply fluid such as air to and from inflatable compartments like compartments 12-17 of a supporting device.

The valve components are held in the housing 332 by a base 452. Suitable snap connections or screws can be used to effect the connection and to allow access for maintenance. A suitable o ring arrangement 454-459 are provided to effect a seal and the formation of the plenums 440-445. In the configuration of FIGS. 10-11, four screws are used to pull the C shaped bracket into the housing of which three screws 460-462 can be seen interconnecting to receivers 464-466.

Figure 12:
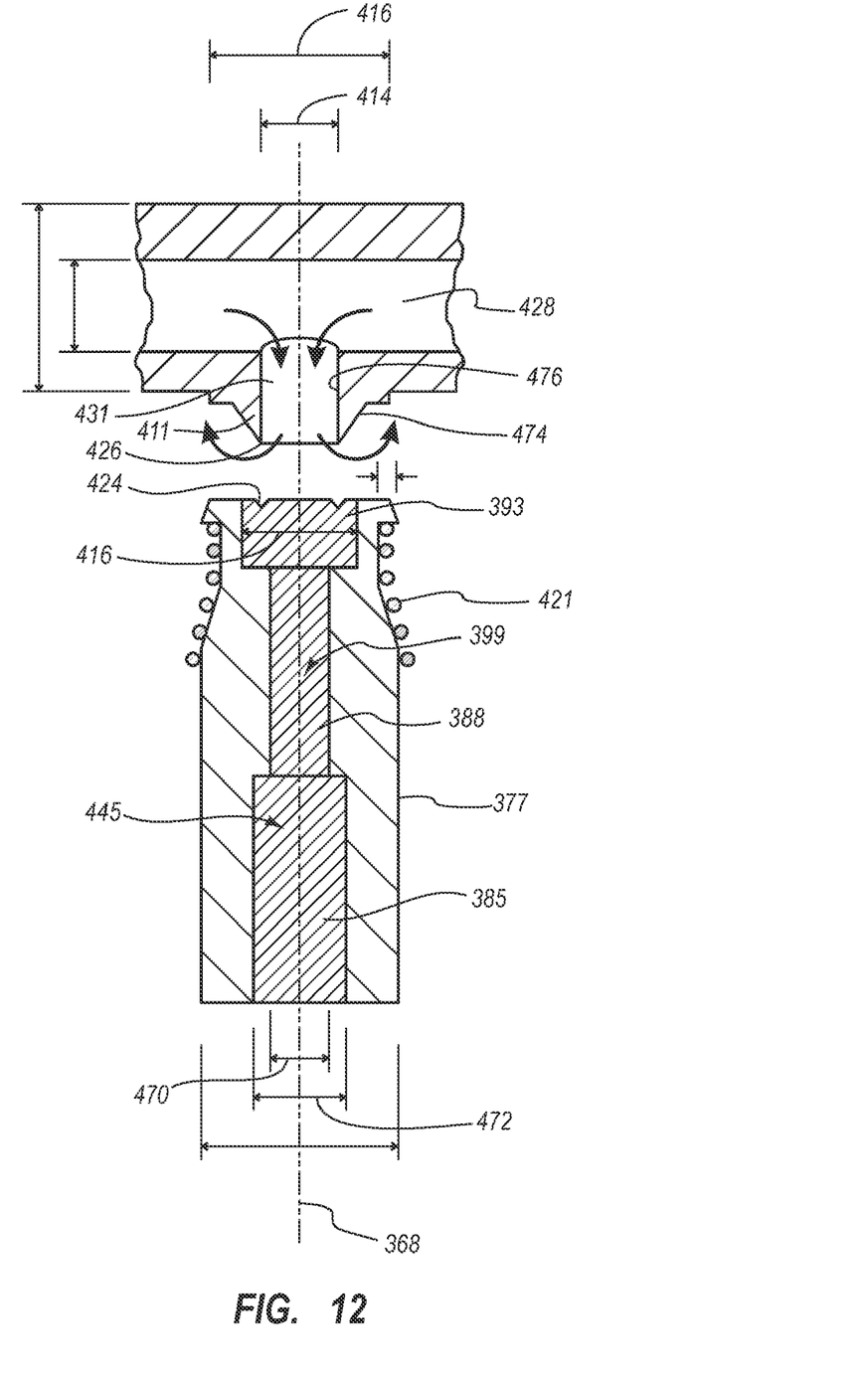
FIG. 12 is a simplified cross sectional cut-away depiction of a solenoid valve for use in the valve assembly of FIG. 4.

FIG. 12 is a simplified cross sectional view of the solenoid valve assembly of FIG. 11 and enlarged to illustrate the relationship between the core 377 that is movable by its armature 337 to and from the valve seat 411. The core 377 has a bore 385 that is formed along the central axis 368. The bore 385 is here formed to have an upper large diameter section 393, a small diameter section 399 and a bottom large diameter section 445. The large diameter section 393 has a diameter 416 that is selected to be larger than the diameter 414 of the valve seat 411. The diameter 416 is also larger than the diameter 470 of the small diameter section. The diameter 472 of bottom large diameter section 445 is more than the diameter 470 and may be less than or more than the diameter 416 of the upper large diameter section 393.

The bore 385 is filled with a filler 388 that is elastically deformable and preferably essentially inert when cured. That is, the filler 388 is preferably a material that can be prepared in liquid form and poured or injected into the bore 385 where it cures and in turn hardens. When it is cured or hardened, it is elastically deformable. The spring 421 is positioned to urge the core 377 upwardly toward and against the valve seat 411. Because the filler 388 is elastically deformable, the valve seat 411 is urged into the filler 388 to create a dent 424 thereby creating or effecting a seal as the filler 380 presses up and against the sides 474 and 476 of the conically shaped valve seat 411. While the valve seat 411 shown has a sharp edge 426, it should be also understood that the valve seat 411 may be flat or have a rounded edge. So long as the seat presses into the filler 488, it is believed that a seal will be effected. With the core 377 in the open position as shown in FIG. 12, air or other fluid may proceed from the line 428 and through channel 431 and into a plenum 444. Of course, with the armature deactivated, the spring 421 urges the core 377 back against the valve seat 411 to effect a seal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 13:
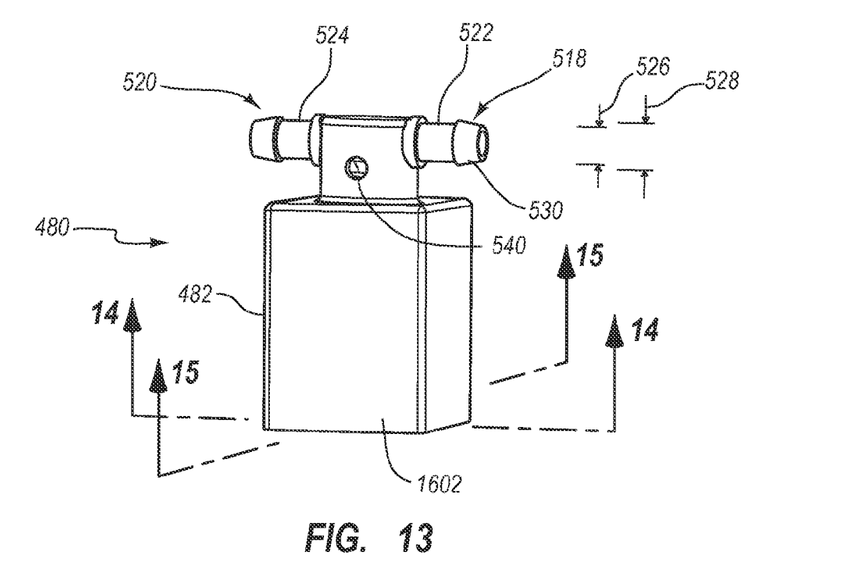
FIG. 13 is a perspective view of a vent valve for use with a mattress system of FIG. 1
Figure 14:
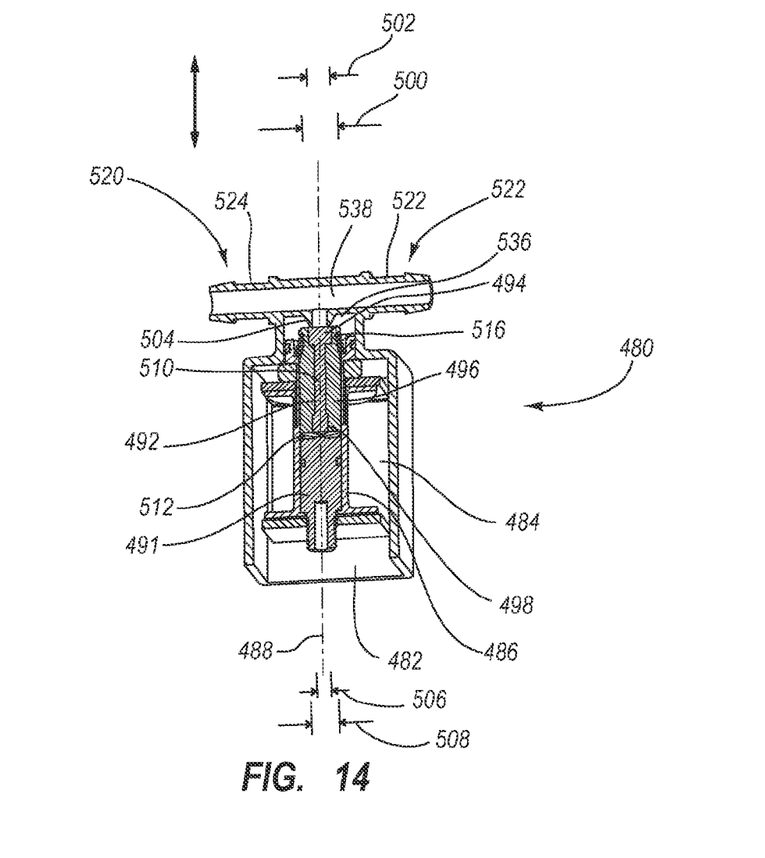
FIG. 14 is a cross sectional depiction in perspective of a vent valve of FIG. 13 along section lines 14-14.
Figure 15:
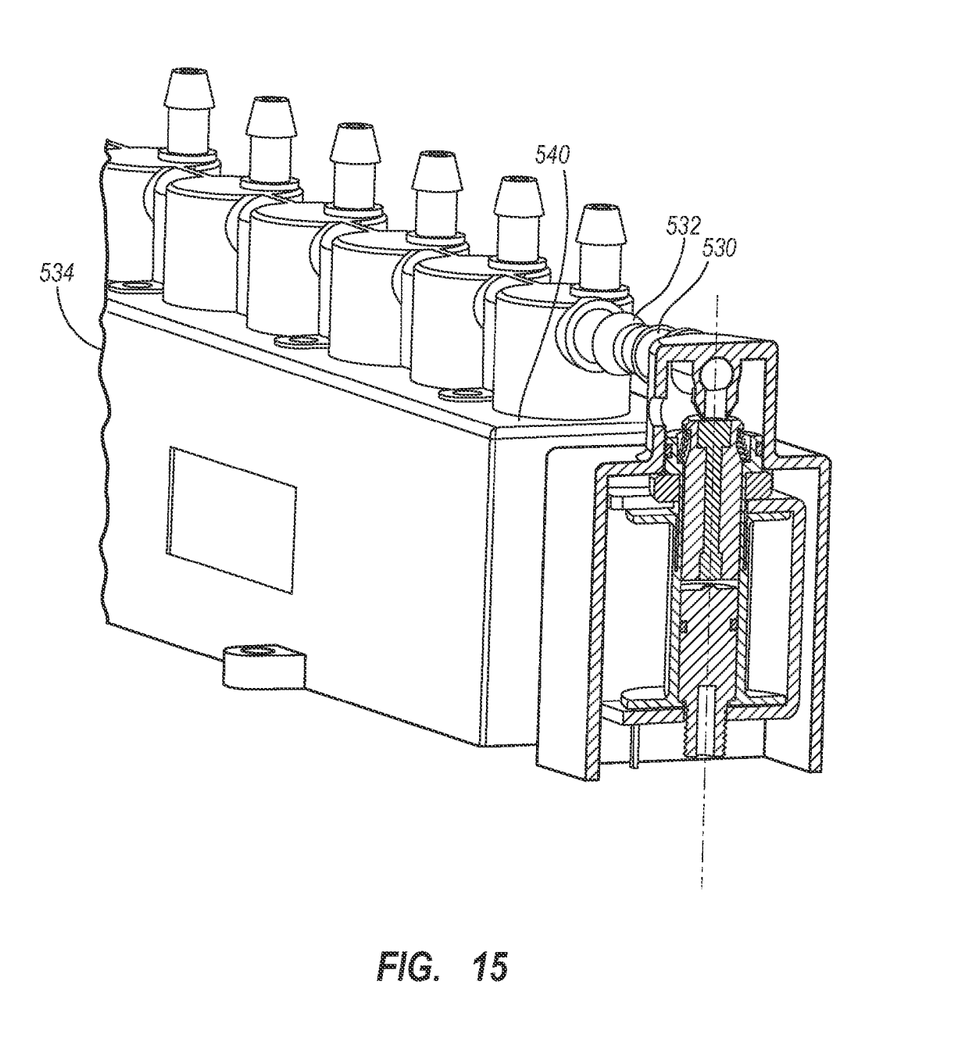
FIG. 15 is a cross sectional depiction in perspective of a vent valve of FIG. 13 along section lines 15-15 with a valve assembly connected thereto.

As stated with respect to FIG. 1, a system as depicted has a vent valve such as vent valve 480 seen in FIGS. 13, 14 and 15. In FIGS. 13 and 14, the vent valve 480 is structured much like the solenoid valves of FIGS. 10 and 11. The vent valve 480 has a housing 482 within which a cylindrical coil or solenoid 484 is positioned. The coil 484 has a hollow bore 486 formed along a central axis 488. The bore 486 is sized to receive a core 490 that is here formed to have a hollow cylindrical interior 492 with an upper large diameter section 494, a small diameter section 496 and a lower section 498. The large diameter section 494 has a diameter 500 that is selected to be larger than the diameter 502 of the valve seat 504. The diameter 502 of the large diameter section 494 is also larger than the diameter 506 of the lower section 491. The diameter 500 of the large diameter section 494 is more than the diameter 508 of the small section 496 and may be less than or more than the diameter 506 of the lower section 498.

The interior 492 of the core 490 is filled with a filler 510 comparable to filler 388. The filler 510 is elastically deformable and preferably essentially inert when cured. That is, the filler 510 is preferably a material that can be prepared in liquid form and poured or injected into the interior 492. In order to reduce valve noise and potentially some wear, the filler 410 in this configuration extends through the interior 492 and is formed to extend through the interior 492 and form a cushion 512 below the core 490. While the cushion 512 is shown to be cylindrical with a diameter comparable to the diameter of core 490, it may be in any shape or configuration that is convenient like a button or drop sized sufficiently to elastically deform and to inhibit the contact of the core 490 with the core stabilizer 514.

The vent valve 480 has a spring 516 that functions comparable to springs 418-423 in FIGS. 10 and 11. It is positioned to urge the core 490 upwardly toward and against the valve seat 504. Because the filler 510 is elastically deformable, the valve seat 504 is urged into the filler 510 to create a dent or depression sufficient to effect a seal as hereinbefore discussed.

The housing 482 has a first connector 518 and a second connector 520 that are both depicted as "barb" connectors. That is, the connectors 518 and 520 have a tubular section 522 and 524 that has a diameter 526 that is comparable to the inside diameter of typical tubing that is used to interconnect components in the system (e.g., ½ inch inside diameter TYGON® tubing). The connectors 518 and 520 have a larger diameter 528 (e.g., 9/16 of an inch to 5/8 of an inch) tapering down 530 to the tubing inside diameter (e.g., ½ inch). Thus, the tubing can be urged onto the connectors 518 and 520 and deform over the taper and the large diameter 528. The deformation of the tube as it is urged onto a connector 518 or 520 exerts a force to effect a seal.

In FIG. 15, the connector 520 is shown being urged frictionally into a receiver 532 to effect a connection to the inlet or supply line to a valve assembly 534. In operation, fluid such as air pressurized at about 1.5 pounds per square inch is supplied in the line for delivery through valves in a valve assembly like valve assembly 534 to compartments forming a support surface. With a valve like those in FIGS. 13 and 14 open and the vent valve 480 closed, air proceeds through the valve assembly 534 to the compartments like compartments 12-17 of FIG. 1. To vent air from the compartments, a solenoid valve of the valve assembly 534 is placed in the open position. Thus, fluid can proceed from the inflated compartment like compartment 12-17 to the plenum 440-445 and then through or past the valve seat in the open position with the core 374-379 displaced from the seat 402-409. The air then proceeds into the line like line 438 to line 538. Thereafter, the air proceeds past the valve seat 504 and into the plenum 536 to the vent hole 540 which has been sized appropriately (e.g., ⅛ inch to about ¼ inch) to vent with out restriction.

It should be noted that solenoid valves like those shown in FIGS. 10-12 as well as vent valve 13-15 shown in FIGS. 25-27 also act as relief valves to guard against over pressure conditions in any associated inflated compartments. That is, as the pressure in a compartment like compartment 12-17 if FIG. 1 increases, that pressure is reflected in the plenums 440-445 and, in turn, on the area of the core 374-379 outward of the seat 408-413. With a high enough pressure in the plenums 440-445, the force exerted on the area of the core 374-379 will overcome the force of the spring like spring 516 and, in turn, open the vent valve so that fluid such as air can proceed in the lines 438 to line 538 and exert a force on top of the 490. When sufficient, it can force the core 490 down overcoming the force of the spring 516. In turn, air from line 538 proceeds into the plenum 536 and then through the vent 540 to atmosphere. Thus, the vent valve and the valve assemblies operate to protect from over pressure throughout the related system.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A valve assembly for use with a system for supporting a body positioned on a support surface having at least one inflatable chamber, said valve assembly comprising:
a valve housing having first conduit means and second conduit means, said first conduit means being configured to receive from and to supply fluid at a low pressure to exterior said valve housing and said second conduit means being configured for connection to said at least one inflatable chamber to receive therefrom and to supply thereto said fluid at a low pressure;
valve means positioned in said valve housing, said valve means being connected to receive and supply said fluid at a low pressure from and to said first conduit means and being connected to receive and to supply said fluid at a low pressure from and to said second conduit means, said valve means being operable between an open position in which said fluid is flowable between said first conduit means and said second conduit means and a closed position in which flow of said fluid at a low pressure between said first conduit means and said second conduit means is inhibited, said valve means further comprising a valve seat with an aperture for said fluid to flow there through, said aperture in communication with said first conduit, said valve seat circular in projection and formed to have a circular edge;
said valve means further comprising a valve stem sized to extend outwardly away from said edge of said valve seat to define an area on the outside valve stem when in said closed position sized to interact with the fluid in said chamber at a chamber pressure above said low pressure and to move down to open said valve to protect said chamber from an overpressure condition; and
solenoid means positioned in said valve housing and connected to operate said valve means between said open position and said closed position, said solenoid means being connectable to a remote source of operating signals to cause said solenoid means to operate to move said valve means between said open position and said closed position.

2. The valve assembly of claim 1 wherein said valve stem has a bore formed therein with a fill made of an elastically deformable material positioned in said bore to register with and deformably receive said circular edge into said filler when said valve is in said closed position.

3. The valve assembly of claim 1 further including a spring positioned to urge said valve stem toward said closed position.

4. A valve assembly for use with a system for supporting a body positioned on a support surface having at plurality of inflatable chambers, said valve assembly comprising:
a valve housing having a first channel and a plurality of second channels, said first channel being configured to receive from and to supply fluid at a low pressure to exterior said valve housing and each of said plurality of second channels each being configured for connection to one of said plurality of inflatable chambers to receive therefrom and to supply thereto said fluid at a low pressure;
a plurality of valves each positioned in said valve housing, each of said plurality of valves being connected to receive from and supply said fluid at a low pressure to said first channel and each of said plurality of valves being connected to receive and supply said fluid at a low pressure from and to one of said plurality of second channels, each of said plurality of valves being operable between an open position in which said fluid at a low pressure is flowable between said first channel and said one of said plurality of said second channels and a closed position in which the flow of said fluid at a low pressure between said first channel and said one of said plurality of said second channels is inhibited;
each of said plurality of valves further comprising:
a valve seat with an aperture for said fluid to flow there through, said aperture in communication with said first channel, said valve seat circular in projection and formed to have a circular edge; and
a valve stem sized to extend outwardly away from said edge of said valve seat to define an area on the outside valve stem when in said closed position sized to interact with the fluid in said chamber at a chamber pressure above said low pressure and to move down to open said valve to protect said chamber from an overpressure condition; and
a plurality of solenoids each positioned in said valve housing and each connected to operate one of said plurality of valves between said open position and said closed position, each of said solenoids being connectable to a remote source of operating signals to cause said solenoid to operate said valve between said open position and said closed position.

5. The valve assembly of claim 4 wherein said valve seat has a seat seal structure and wherein said valve head has a sealing surface to effect a seal between said seat seal structure and said sealing surface when said valve is in said closed position.

6. The valve assembly of claim 4 further including a plurality of springs each positioned to urge each of said plurality of valves toward said closed position.

7. The valve assembly of claim 4 further including a first connector attached to said valve housing for connecting an exterior conduit to said valve housing for communication of fluid to and from said first channel.

8. The valve assembly of claim 7 further including a second connector attached to said valve housing for connecting said first conduit to a first conduit of another valve assembly.

9. The valve assembly of claim 8 further including a plurality of third connectors each attached to said valve housing and each for communicating with one of said plurality of second channels.

10. The valve assembly of claim 9 wherein each of said second channels has a plenum formed proximate said valve seat and a conduit for communicating said fluid at said low pressure to and from one of said plurality of third connectors.

11. The valve assembly of claim 10 wherein said fluid at said low pressure is under a pressure of about 5 pounds per square inch.

12. The valve assembly of claim 11 wherein said fluid at said low pressure is under a pressure of about 0.5 pounds per square inch.

* * * * *